(12) United States Patent
Soh et al.

(10) Patent No.: US 9,227,578 B2
(45) Date of Patent: Jan. 5, 2016

(54) WASHER-RETAINING BRACKET CONFIGURATION

(75) Inventors: Shutoh Soh, Makinohara (JP); Fumiyoshi Ohashi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 268 days.

(21) Appl. No.: 13/438,143

(22) Filed: Apr. 3, 2012

(65) Prior Publication Data

US 2012/0248275 A1 Oct. 4, 2012

(30) Foreign Application Priority Data

Apr. 4, 2011 (JP) ................................. 2011-082655

(51) Int. Cl.
*F16D 1/00* (2006.01)
*B60R 16/02* (2006.01)

(52) U.S. Cl.
CPC .................. *B60R 16/0215* (2013.01)

(58) Field of Classification Search
CPC ....... F16B 37/047; F16B 21/09; F16B 5/0241
USPC ............... 248/220.21, 220.22, 225.11, 224.8,
248/223.41; 174/93, 152 G, 153 G; 411/104;
403/408.1
See application file for complete search history.

(56) References Cited

U.S. PATENT DOCUMENTS

| | | | | |
|---|---|---|---|---|
| 2,295,466 | A * | 9/1942 | Hafele | 411/120 |
| 3,978,761 | A * | 9/1976 | Sosinski | 411/5 |
| 5,306,973 | A * | 4/1994 | Butcher et al. | 310/68 C |
| 5,793,921 | A * | 8/1998 | Wilkins et al. | 385/135 |
| 5,807,038 | A * | 9/1998 | Skinner | 408/204 |
| 6,198,048 | B1 * | 3/2001 | Juhel et al. | 174/84 R |
| 6,254,302 | B1 * | 7/2001 | Kraus | 403/326 |
| 6,284,976 | B1 * | 9/2001 | Pulido et al. | 174/77 R |
| 6,594,870 | B1 * | 7/2003 | Lambrecht et al. | 24/297 |
| 6,721,483 | B2 * | 4/2004 | Grubish et al. | 385/135 |
| 7,581,301 | B2 * | 9/2009 | Arbona et al. | 29/525.02 |
| 7,784,857 | B2 * | 8/2010 | Naik et al. | 296/193.1 |
| 2004/0129096 | A1 * | 7/2004 | Vilou et al. | 74/7 C |
| 2009/0273201 | A1 * | 11/2009 | Slack | 294/86.25 |
| 2011/0064539 | A1 * | 3/2011 | Ghatikar et al. | 411/371.2 |

FOREIGN PATENT DOCUMENTS

| | | |
|---|---|---|
| JP | 4-127405 U | 11/1992 |
| JP | 05-292628 A | 11/1993 |
| JP | H10-67011 A | 3/1998 |
| JP | H10-335848 A | 12/1998 |
| JP | 2007-097322 A | 4/2007 |

OTHER PUBLICATIONS

Office Action mailed on Jun. 23, 2015 issued for corresponding Japanese Patent Application No. 2011-082655.

* cited by examiner

*Primary Examiner* — Terrell McKinnon
*Assistant Examiner* — Michael McDuffie
(74) *Attorney, Agent, or Firm* — Locke Lord LLP

(57) ABSTRACT

The present invention provides a bracket configuration for retaining a washer within a washer case which has an opening for inserting the bracket therethrough so that the washer case is mounted to the bracket from above the washer. The bracket configuration specifically includes a hole configured to dispose the washer thereon and insert a bolt therethrough, and a rib formed along an edge of the opening so as to prevent or protect the washer from deviation or disconnection via a clearance gap created between the opening and the bracket.

7 Claims, 4 Drawing Sheets

WASHER-RETAINING BRACKET CONFIGURATION

BACKGROUND OF THE INVENTION

1. Field of the Invention

The present application claims priority of Japanese Patent Application No. 2011-82655 filed on Apr. 4, 2011, the disclosure of which is expressly incorporated by reference herein in its entirety.

The invention relates to a bracket configuration for retaining a washer in a washer case when a bracket of an electric junction box is fixed to a vehicle via screw tightening or fastening.

2. Description of the Related Art

Conventionally, a variety of brackets have been proposed for fixing a bracket of an electric junction box to a panel of a vehicle body and so on via bolting.

For example, JP H4-127405 (A) (not shown) discloses that a movable member having a nut is slidably inserted into the groove of the mounting portion of a box, a bolt which is inserted into the hole of a panel is threaded via the long hole of the mounting portion into the nut, and then the mounting portion is tightly fixed to the panel. For more detail, see JP H4-127405 (A), FIG. 1.

Also, JP H5-292628 (A) (not shown) discloses that an annular metallic collar is disposed in the hole of a mounting portion of an electric junction box, a bolt which is inserted into the collar is threaded via the hole of the bracket for a vehicle into a nut, and the mounting portion is then tightly fixed to the bracket for the vehicle. For more detail, see JP H5-292628 (A), FIG. 3.

Furthermore, JP 2007-97322 (A) (not shown) discloses that a sliding projection, which has a T-shaped cross-section and is a part of a connector holder, slidably engages with a lock portion of the lower cover of an electric junction box. In other words, JP 2007-97322 (A) is not directed to connection by bolting. For more detail, see JP 2007-97322 (A), FIG. 8.

Alternatively, it has been proposed a bracket structure which is formed of synthetic resin, is at least a part of an electric junction box, and is fixed via a metallic flat washer to the panel of a vehicle by means of connection by bolting. However, in the afore-mentioned bracket structure there has been a problem that the washer is inclined to be easily deviated or disconnected from the bracket. In order to prevent or eliminate this problem (i.e., deviation or disconnection), there has been proposed an approach or configuration that a washer case is slidably fit into a bracket, and a washer is retained within the washer case. However, in a case where there is a relatively larger clearance gap between the washer case and the bracket, the washer may be disconnected or dropped off from the washer case via the clearance gap.

Moreover, when the washer case is slidably fit into the bracket, a relatively great force is needed, thus adversely affecting workability. In addition, because a locking hole of the washer case is forced to mate with a locking projection of the bracket, the washer case may run on the locking projection thereby enlarging in a radial direction of the washer. In other words, the washer case undergoes deformation. In this situation, even if the washer case is restored from the deformation, the clearance gap has a tendency to be created in a direction of a thickness of the washer. Under the circumstance, the washer is inclined to be deviated or disconnected from the washer case due to the clearance gap.

The afore-mentioned problems or drawbacks may also be found in a case where the bracket is to be fixed to a vehicle body in an area of a harness protector or a connector (not shown).

SUMMARY OF THE INVENTION

In order to overcome the afore-mentioned drawbacks and problems, the invention is provided. For more detail, the present invention is proposed for prevention of a washer from disconnection or deviation from a washer case when the washer is retained within the washer case which is mounted to a bracket. In addition, the present invention provides a washer-retaining bracket configuration which enables the washer case to be slidably fit into and locked with the bracket with less force while suppressing any harmful deformation which may cause the clearance gap between the washer case and the bracket.

In one aspect, the present invention provides a bracket configuration for retaining a washer within a washer case which has an opening for inserting the bracket therethrough so that the washer case is mounted to the bracket from above the washer. The bracket configuration specifically includes a hole configured to dispose the washer thereon and insert a bolt therethrough, and a rib formed along an edge of the opening so as to prevent or protect the washer from deviation or disconnection via a clearance gap created between the opening and the bracket.

Preferably, the bracket has a circular depression configured to receive the washer therein and formed around the hole, and the rib has an arc-like inner surface formed along an inner periphery of the depression.

Preferably, the bracket has an vertical wall and the inclined wall which is continuous with the vertical wall and the washer can be disposed on, the rib extends from a site where the vertical wall intersects with the inclined wall such that the rib has an outer surface which lies the same plane with an extended surface of the vertical wall, and the rib has both sides which are higher than a center portion of the rib.

Preferably, the bracket has a guide rail disposed in its lateral portion and engageable with an slidable engaging portion of the washer case, the guide rail has a locking projection, which is formed on an outer surface of the guide rail and engageable with an engaging hole of the washer case, and the slidable engaging portion has a flexible thin wall formed from the opening to a near side of the engaging hole.

BRIEF DESCRIPTION OF THE DRAWINGS

The invention may be put into practice in various ways and a number of embodiments will be described by way of example to illustrate the invention with reference to the accompanying drawings, in which.

DETAILED DESCRIPTION OF THE PREFERRED EMBODIMENTS

FIGS. 1-8 show one embodiment of a washer-retaining bracket configuration in accordance with the invention.

Figure 1:
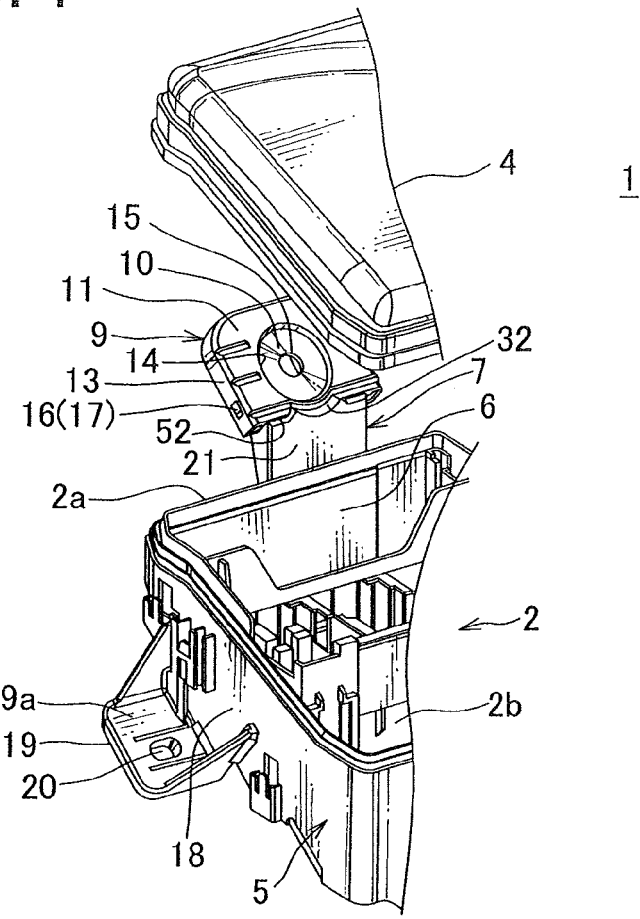
FIG. 1 shows an exploded perspective view of the main section of one embodiment of an electric junction box comprising one embodiment of a washer-retaining bracket in accordance with the invention.

With reference to FIG. 1, a washer-retaining bracket at least partly constitutes an electric junction box 1 such as a relay block. The electric junction box 1 includes a frame 2 formed of synthetic resin (i.e., a body of the electric junction box), a connection block (not shown) which is formed of insulating resin and is inserted into the frame 2 from the lower side of the frame 2, a lower cover 3 (FIG. 2) which is formed of synthetic resin and is mounted to the lower side of the frame 2 so as to seal or close an lower opening of the frame 2, and an upper cover 4 which is formed of synthetic resin and is mounted to the upper side of the frame 2 so as to seal or close an upper opening 2a of the frame 2.

Figure 2:
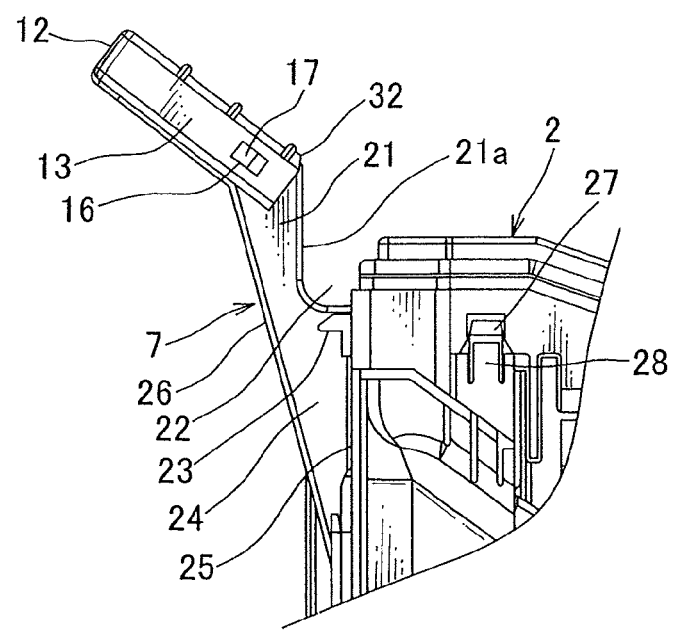
FIG. 2 shows a side view of the main section of an electric junction box comprising a washer-retaining bracket.

The connection block (not shown) generally includes a portion for attachment of a relay, a portion for attachment of a fuse, a portion for attachment of a fusible link, a connector, and so on. The lower cover 3 as shown in FIG. 2 is configured to protect an electrical wire which is connected to an electrical component such as a relay and a fuse and/or a terminal portion of a connector. The electrical wire extends through the lower cover 3.

The frame 2 includes a peripheral wall 5 which extends vertically and constitutes an inner space 2b for accommodating a block, and a bracket 7 which extends vertically and is disposed on the outer face of the rear wall 6 of the peripheral wall 5. The frame 2 and the inner space 2a have an upper opening 2a and lower opening. A washer case 9 is slidingly mounted to an inclined wall 8 (see FIG. 4) which is inclined upward from the upper end portion of the bracket 7 such that a circular flat metallic washer 10 is movable in a certain extent or range in a radial direction within the washer case 9.

The washer case 9 includes a inclined, substantially rectangular upper wall 11, peripheral walls 12 (see FIG. 2) and 13, a front opening through which the bracket 7 is introduced or inserted, and a circular hole 14 which is formed in the upper wall 11 and has a hole diameter smaller than the outer diameter of the washer 10. The peripheral walls (12, 13) include an upper peripheral wall 12, and left and right peripheral walls 13. The top surface of the washer 10 is placed along the inner surface of the upper wall 11. In the center portion of the washer 10, there is provided a relatively small-size hole 15 which is configured to introduce or insert a blot therethrough. A locking projection 17 (see FIG. 4) of the bracket 7 is fitted into an engaging hole 16 of the washer case 9 such that the washer case 9 is fixed to the bracket 7. Furthermore, directions such as right and left, upper and lower, and front and rear as described herein do not necessarily correspond to a direction in which the electric junction box 1 is assembled.

An additional bracket 19 other than the bracket 7 is disposed in a vertical wall 18 which resides in the left side of the frame 2. The vertical wall 18 may be also called as "a left vertical wall". The bracket 19 has a hole 20 configured to introduce or insert a bolt and formed in its lower horizontal plate portion 19a. The bracket 19 can be fixed to a vehicle body and so on by tread fastening. The height of the bracket 7 which vertically extends and is adjacent to the rear wall 6 of the frame 2 is greater than the height of the upper opening 2a of the frame 2. The washer case 9 and washer 10 are disposed such that they are substantially identical to or higher than the upper cover 4 which is mounted to the frame 2.

With reference to FIG. 2, a vertical upper half (i.e., a vertical wall) 21 of the bracket 7 is spaced apart from the upper end portion of the rear wall 6 of the frame 2 in a rear direction. In other words, there is a relatively large clearance gap between the vertical upper half 21 of the bracket 7 and the upper end portion of the rear wall 6 of the frame 2. As such, the upper cover 4 (see FIG. 1) can be smoothly mounted to the frame 2. A reference numeral 23 represents a locking portion for engaging with the upper cover 4. In accordance with the embodiment, the bracket 7 is resin-molded independently of the frame 2, and a lower half 24 of the bracket 7 is slidably fitted into or locked with a vertically extending, rail-shaped locking portion 25 of the frame 2. The bracket 7 is shown to include an inclined rear wall surface 26 and an upper vertical front wall surface 21a. A reference numeral 3 represents a part of the lower cover (i.e., an upper projecting portion). The lower cover 3 engages with and is thus locked with the engaging portion 28 of the frame 2 in the area of a locking portion 27.

Figure 3:
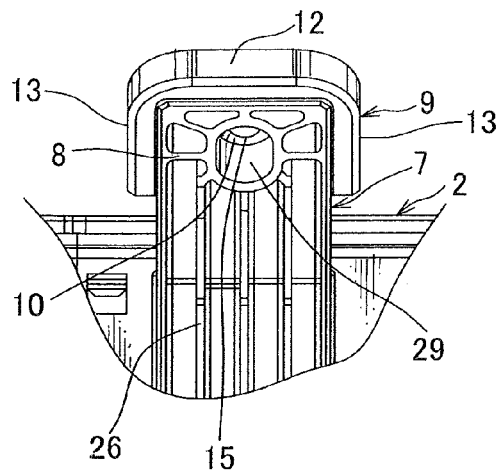
FIG. 3 shows a rear view of the main section of an electric junction box comprising a washer-retaining bracket.

Referring to FIG. 3, the inclined rear wall surface 26 of the bracket 7 is continuous with the rear surface of the upper, slightly inclined wall 8. More specifically, the inclined rear wall surface 26 can be at least partly defined by rear surface of the rib wall. The peripheral walls 12 and 13 of the washer case 9 are disposed such that they encompass or surround left, right, and upper peripheries of the inclined wall 8. A hole 29 for introducing or inserting a bolt therethrough is disposed in the center of the inclined wall 8 in the across-the-width direction (i.e., in a width direction). The hole 29 for introducing or inserting a blot therethrough is vertically elongated, and has a diameter greater than the diameter of the hole 15 formed in the washer 10.

Figure 4:
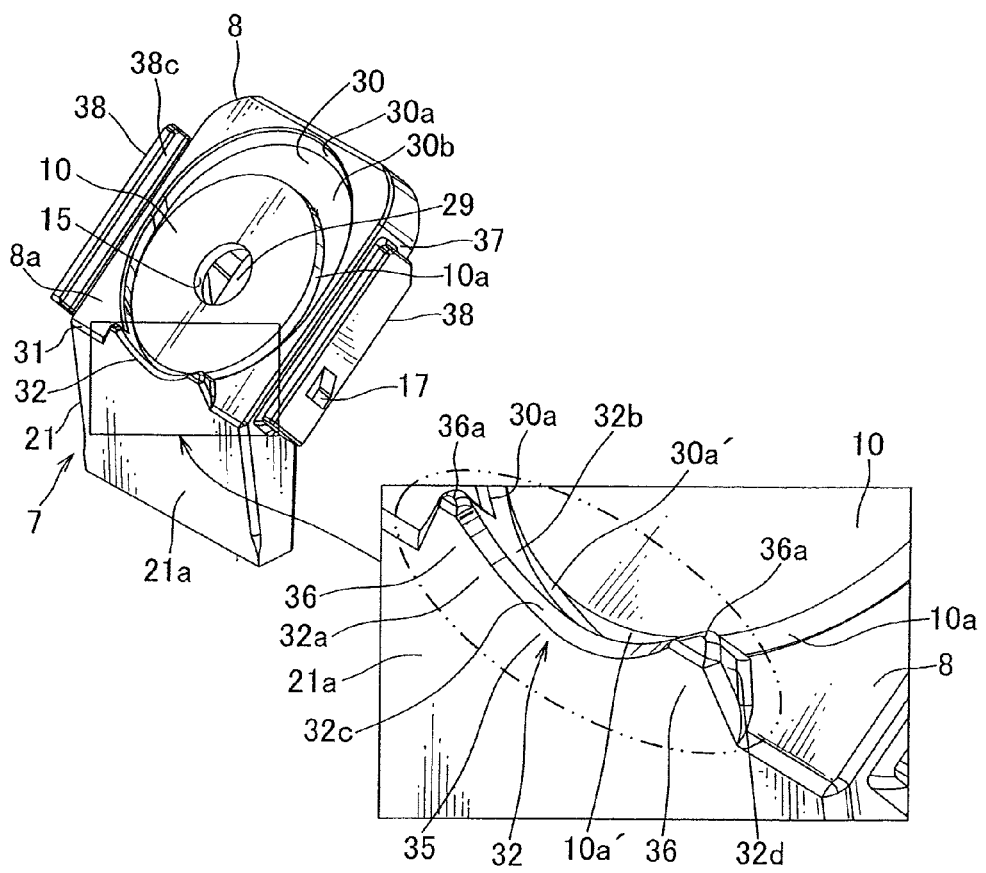
FIG. 4 shows a perspective view of a washer-retaining bracket configuration before a washer case being mounted thereto. A boxed section on the right side represents enlarged view of a main section.

Referring to FIG. 4, the bracket 7 has a circular depression 30 which is disposed in the top of the upper inclined wall 8, is configured to receive or accommodate the washer, and has an inner diameter greater than the outer diameter of the washer 10. The washer 10 disposed inside the depression 30 is movable in a radial direction within a range of clearance gap between the outer periphery 10a of the washer 10 and the circular inner periphery 30a of the depression 30. Preferably, the depth of the depression 30 is substantially identical to or slightly greater than the thickness (i.e., sheet thickness) of the washer 10. The inner periphery 30a of the depression 30 is continuous with an inclined bottom wall surface 3b while being perpendicular to the inclined bottom wall surface 3b. A hole 29 which is vertically elongated is disposed in the bottom wall surface 30b.

The inclined wall 8 of the bracket 7 is continuous with a lower vertical wall 21 (i.e., a support wall) while intersecting with the lower vertical wall 21. In the area of an intersecting or crossing portion 31 where the upper inclined surface 8a of the inclined wall 8 intersects with a vertical front surface 21 of the vertical wall 21, a rib (i.e., a projecting wall) 32 upwardly extends so as to prevent disconnection or deviation of the washer. In FIG. 4, the rib 32 is surrounded by a circular chain dash.

The rib 32 includes a vertical front surface 32a which lies in the same plane with the vertical front surface 21a of the vertical wall 21, and is continuous with the vertical front surface 21a of the vertical wall 21. In other words, the rib 32 does not invade or project toward the front surface 21 of the vertical wall 21. As such, the upper case 4 can be smoothly mounted to the frame 2 (see FIG. 1). A skirt portion 32b of the rib 32 can be placed along a lower portion 30a' of the circular inner periphery 30a of the depression 30. The inner or rear inclined surface (i.e., the inner surface) of the skirt portion 32b lies in the same plane with the inner periphery 30a' of the depression 30, and is continuous with the inner periphery 30a' of the depression 30.

Figure 5:
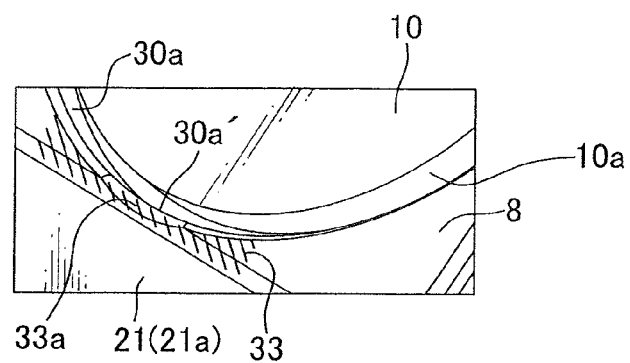
FIG. 5 shows a perspective view of the main section of a washer-retaining bracket configuration in which a rib for preventing washer disconnection or deviation is absent.

For reference, a bracket configuration in which the rib 32 is absent is shown in FIG. 5. In FIG. 5, a site or area in which the rib 32 is formed otherwise is hatched. In accordance with this configuration, the lower end portion 33 of the inner periphery 30a of the depression 30 approximates the front surface 21a of the vertical wall 21. As shown in FIG. 5, only narrow thickness portion 33a is present between the lower portion 33 of the inner periphery 30a of the depression 30 and the front wall 21a of the vertical wall 21. The central portion 35 of the rib 32 in the across-the-width direction (see FIG. 4) extends vertically from the narrow thickness portion 33a. The both side (i.e., a left and right side) thickness portions (i.e., both side portions) 36 are disposed in both sides (i.e., left and right sides) in an across-the-width direction of the rib 32 as shown in FIG. 4 and extend from the lower portion 30a' of the inner surface 30a as shown in FIG. 5 to the upper surface (i.e., an inclined surface) of the inclined wall 8 as represented by a reference numeral 8. The center portion 35 of the rib 32 as a thin wall is made relatively low, and the left and right side portions of the rib 32 are made relatively high. The upper end portion 32c of the rib 32 is arc-like, and the inner surface (i.e., rear surface) 32b of the rib 32 is a downwardly-inclined surface and is continuous with the inner surface 30a' of the depression 30.

The outer periphery 10a' of the lower end portion of the washer 10 abuts against the inner surface (i.e., rear surface) of the rib 32, thereby preventing deviation or disconnection of the washer 10. The deviation or disconnection of the washer 10 can be effectively prevented before and after the washer case 9 being mounted to the bracket 7. Particularly, the washer 10 is also prevented from disconnection or deviation when being disposed in the depression 30 (i.e., before being mounted to the bracket 7). The maximum height of the rib 32, which can be defined as the height of a head portion 36a which at least partly constitutes both right and left sides 36 of the rib 32, may be substantially equal to the thickness (i.e., sheet thickness) of the washer 10. The right and left side end faces 32d of the rib 32 are inclined along a virtual extended line toward an approximate center of the depression 30. The rib 32 is fan-like upon a planar view.

With reference to FIG. 4, each of the guide rails 38 having a T-shaped cross-section is disposed in the outer surface of the left and right side walls 37 of the inclined wall 8 of the bracket 7. Each of the guide rails 38 includes a straight support wall 38a (see FIG. 7) outwardly extending from the center of the outer surface of the side wall 37 in a thickness direction, and a guide wall portion 38b as a perpendicular or vertical plate extending from the support wall 38a in a direction perpendicular to the support wall 38a, and a locking projection 17 formed in the outer surface of the lower half and disposed in the center of the guide wall portion 38b in the across-the-width direction.

The guide rail 38 is inclined at the same angle as the inclined wall 8. The front end (i.e., lower end) of the guide rail 38 is placed at the upper end of the vertical wall 21, the rear end (i.e., upper end) of the guide rail 38 is placed at a level or height of the upper end of the washer 10 which is lower than the upper end of the depression 30. In this configuration, the washer 10 is in a free state. The locking projection 17 includes an upper guide inclined surface 17a and a lower locking surface 17b intersecting with the upper guide inclined surface 17a at a right angle. The width of the guide wall portion 38b is substantially equal to the thickness of the inclined wall 8. A pair of guide grooves 38c including an upper guide groove and lower guide groove are formed between the inner surface of the guide wall portion 38b and the outer surface of the inclined wall 21.

Figure 6:
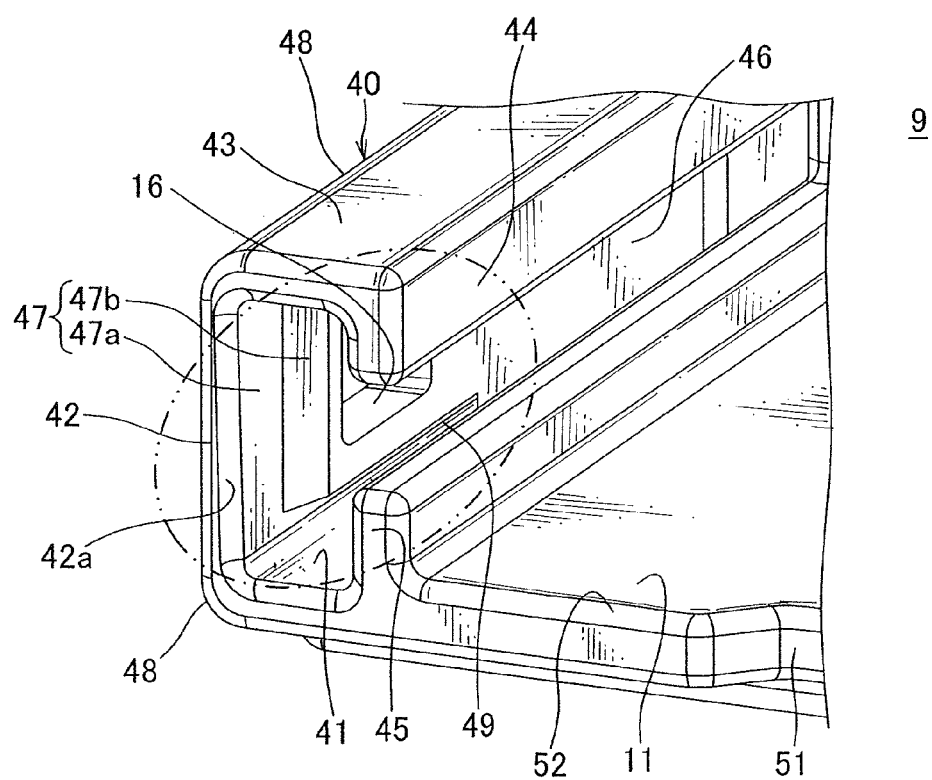
FIG. 6 shows a perspective view of the main section of one embodiment of a washer case which is turned upside down.

As shown in FIG. 6, a slidable engaging portion 40 engageable with the guide rail 38 of the bracket 7 is integrally with the right and left side edges of the washer case 9. For reference, FIG. 6 shows the washer case 9 in reverse. Each of the slidable engaging portions 40 includes an upper extending wall 41 which lies in the same outer plane with the upper wall 11 of the washer case 9 and is continuous with the upper wall 11 of the washer case 9, a side wall 42 intersecting with the upper extending wall 41 and extending from the upper extending wall 41, a lower extending wall 43 intersecting with the side wall 42 and extending from the side wall 42, and a lower flanged wall 44 intersecting with the lower extending wall 43 and formed in the shape of rib (i.e., formed as a rib projection), an upper flanged wall 45 opposed to the lower flanged wall 44 and projecting in the boundary or border between the upper wall 11 and the upper extending wall 41, and an rectangular engaging hole 16 adjacent to the open end 42a of the side wall 42.

Figure 7:
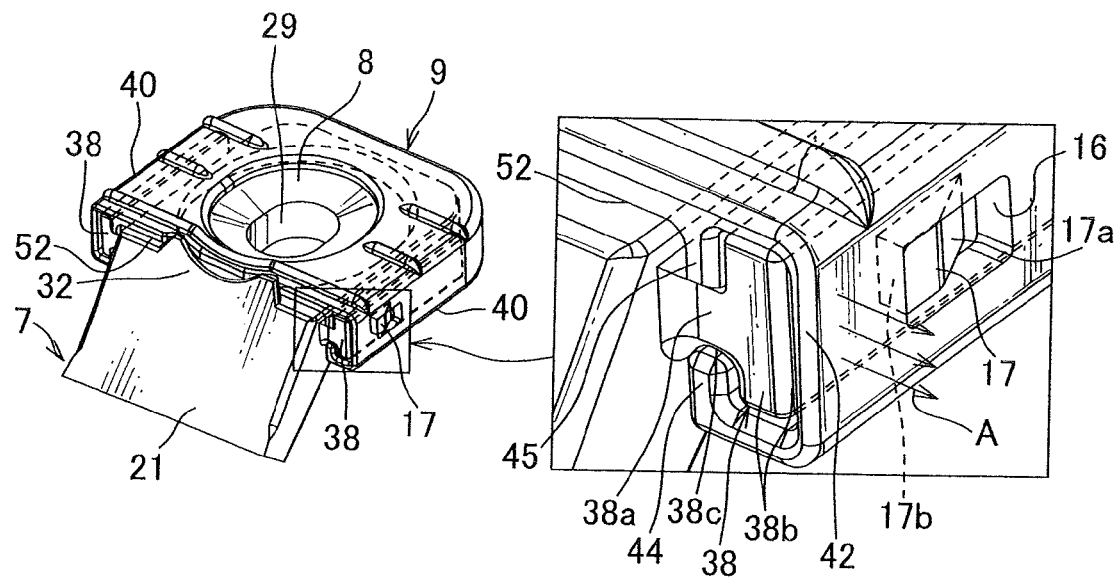
FIG. 7 shows a perspective view of a washer-retaining bracket configuration after a washer case being mounted thereto. A boxed section on the right side represents enlarged view of a main section.

Between a pair of the flanged walls (i.e., the upper and lower flanged walls) there is provided a clearance gap for slidably engaging the support wall portion 38a of the guide rail 38 (see FIG. 7). The clearance gap 46 is encompassed with or surrounded by the upper and lower flanged walls 44 and 45, and the upper and lower extending walls 41 and 43, and the side wall 42. As a result, there is provided a groove-like space as represented by a reference numeral 41 for engaging with the guide wall portion 38b of the guide rail 38 in a slidable manner.

As shown FIG. 6, a flexible thin wall 47 having a tapered surface (i.e., inclined surface) 47b and projecting from the vertical plane 47a extends from the front opening 42a to the engaging hole 16 in the left and right edge portions (i.e., side walls) 42 of the washer case 9. A narrow groove-like flexible thin wall 49 is straightly formed from the front opening 42a to a position adjacent to the engaging hole 16 and behind the engaging hole 16 in a portion 48 intersecting with the upper and lower extending walls 41 and 43 of the side wall 42. As such, the side wall 42 partly becomes thinner.

Because the front opening 42a has the tapered or chamfered surface as represented by a reference numeral 42a, the flexible thin wall 47 extends from the tapered surface 42a to a position near from or just before the engaging hole 16. As such, the front half of the thin wall 47 corresponds to a planar surface 47a parallel to the outer surface of the side wall 4a, and the rear half of the thin wall 47 corresponds to an inclined surface 47b. The narrow groove-like horizontal thin wall 49 is formed with a depth greater than that of the front half 47a of the thin wall 47 in a vertical direction of the thin wall 47.

With reference to FIG. 6, the thin walls 47 and 49 are encircled by a dashed line. In accordance with the embodiment, the engaging hole 16 is encompassed with or surrounded by the thin walls 47 and 49. More specifically, the front, upper and lower sides of the engaging hole 16 is encompassed with or surrounded by the thin walls 47 and 49. The front thin wall 27 terminates in vicinity with the engaging hole 16, and the upper and lower thin walls 49 are divided in vicinity with the engaging hole 16, and are respectively parallel to the upper and lower ends of the engaging hole 16. As such, inner surface area of the engaging hole 16 for receiving or accommodating the locking projection 17 therein is guaranteed. The both thin walls extend from the front opening 42a to a near side of (or, just before) the engaging hole 16.

When the locking projection 17 slidably proceeds into the engaging portion 40, due to the flexible thin walls 47 and 49 the side wall 42 outwardly bends with ease (i.e., with less force). As such, the locking projection 17 can be smoothly inserted into the engaging portion 40.

Moreover, after the locking projection 17 passes the thin wall 47 on the near side of the engaging hole 16 (in other words, when the locking projection 17 engages with the engaging hole 16), the side wall 42 is elastically outwardly restored. Accordingly, the outer side of the side wall 42 as represented by arrow A in FIG. 7 is protected or prevented from harmful plastic deformation in comparison with the washer case without any thin walls 47 and 49. As a result, the inner surface area of the engaging hole 16 for receiving or accommodating the locking projection 17 is securely guaranteed. Further, creation of the clearance gap between the upper wall 11 and the inclined wall 8 of the bracket 7 due to outward plastic deformation of the side wall 42 and thus upward curved warping deformation of the upper wall 11, for example when the outwardly deformed side wall 42 is inwardly pressed, is substantially prevented. In this configuration, the clearance gap corresponds to the opening portion as represented by a reference numeral 52. Due to this configuration, even if the clearance gap is present, disconnection or deviation of the washer 10 is protected or prevented by the rib 32.

In FIG. 7, the washer 10 is not shown. The hole 29 for inserting or introducing a bolt therethrough is directly seen in FIG. 7. The washer 10 is enough to be prevented from deviation or disconnection until the electric junction box 1 is fixed to a vehicle by means of bolt fastening, for example, for maintenance.

Figure 8:
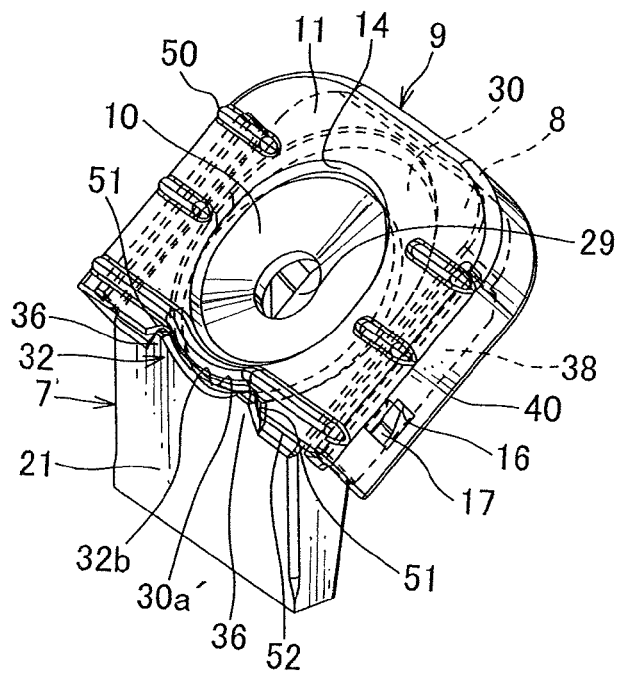
FIG. 8 shows an angled perspective view of the washer-retaining bracket after the washer case being mounted thereto.

With reference to FIG. 8, the washer 10 downwardly moves in a radial direction due to its own weight while being received in the washer case 9, and the lower end of the washer 10 thus abuts against the lower inner periphery 30a' of the depression 30. The upper end of the washer 10 is disposed in the upper end of the circular hole 14 of the upper wall 11 of the washer case 9, and the outer edge (i.e., top surface) of the washer 10 except for its upper end is in contact with the inner surface of the upper wall 11 in the periphery of the hole 14. A reinforcing horizontal protrusion 50 is at least partly formed in the upper wall 11.

A triangular groove-like notch 51, which engages with the left and right peak portion 36 of the rib 32 and thus protects the washer 10 from deviation or disconnection, is formed in the lower end (i.e., front open end) of the upper wall 11. The peak portion 36 engages with the notch 51 so as to position the washer case 9 and suppress the creation of the clearance gap between the washer case 9 and the bracket 7 due to engagement friction. For reference, the clearance gap is created in the opening as represented by a reference numeral 52.

In the state shown in FIG. 8, even if the front open end 52 of the upper wall 11 upwardly opens due to thermal deformation or variation with time, the arc-like lower end (i.e., outer periphery or edge) of the washer 10 abuts against the arc-like rear surface 32b of the rib 32 (see FIG. 4), and the arc-like rear surface 32b of the rib 32 securely receive the arc-like lower end of the washer 10. As such, the washer 10 is securely protected or prevented from deviation or disconnection.

In accordance with the embodiment, the middle portion (i.e., the vertical wall) 21 of the bracket 7 of the electric junction box 1 extends vertically, and the upper end portion (i.e., inclined wall) 8 of the bracket 7 having the depression 30 disposed therein is inclined at a certain angle with respect to the middle portion 21. However, the configuration of the bracket 7 may vary. For example, the end portion 8 of the bracket 7 may be inclined at 90 degrees with respect to the middle portion 21 and horizontally extend. The upper end portion 8 of the bracket 7 may vertically extend from the middle portion 21. The configuration of the bracket 7 as shown in FIG. 8 may be put upside down, and the upper end portion 8 of the bracket 7 is upwardly-inclined. In other words, the inclined wall 8 having the depression 30 disposed therein is upwardly-inclined, and the circular outer surface of the washer as represented by a reference numeral 10 is downwardly-inclined. Even if the specific configuration of the bracket 7 varies as mentioned previously, the rib 32, the guide rail 38 configured to slidably engage with the washer case, and the slidable engaging portion 40 can be also applied to the bracket configuration regardless of its specific shape. In a case where the upper end portion 8 of the bracket 7 vertically extends, the rib 32 may horizontally extend from, or is upwardly-inclined with respect to the vertical front surface of the bracket 7 without causing interference with the upper cover 4 (see FIG. 1).

In accordance with the afore-mentioned embodiment, the washer-retaining bracket configuration has the rib 32, the guide rail 38 for slidably engaging with the washer case, and the slidable engaging portion 40. However, any washer-retaining bracket configuration in which either the set of the guide rail 38 and the sliding engaging portion 40, or the rib 32 is omitted can be effectively used.

In accordance with the embodiment, the washer is formed of metallic material. However, the washer 10 can be also formed of synthetic resin in dependence upon the fastening torque of a bolt used. A fastening bolt (not shown) may be a stud bolt which can be fixed to, for example, a vehicle body. In this case, the bolt is inserted from the lower surface of the washer 10 into the hole 15. Alternatively, a fixed knot such as a weld knot can be provided in a vehicle body. In this case, the bolt may be inserted from the upper surface of the washer 10 into the hole 15.

In accordance with the embodiment, the washer case 9 is fitted into the bracket 7 in a slidable manner. Alternatively, the washer case 9 may be formed of divided parts. For more detail, the washer case 9 may be consisted of upper and lower halves, or left and right halves. In this case, the divided parts can be combined while being mounted to the bracket 7. In other words, the divided parts can be combined while engaging with the locking projection 17 of the bracket 7. In this configuration, the rib 32 of the bracket 7 would effectively protect the washer 10 from any deviation or disconnection.

In accordance with the embodiment, the rib 32 is formed in the bracket 7 so as to protect or prevent the washer from possible deviation or disconnection. However, in a case where the afore-mentioned divided type of the bracket, the rib 32 can be downwardly formed in the front open end 52 of the inclined upper wall 8 of the bracket 7 so as to protect or prevent the washer from deviation or disconnection. In this case, FIG. 8 should be turned upside down, and the tip portion 8 of the bracket 7 should be upwardly bent or inclined so as to downward locate the circular outer surface of the washer 10. The circular outer surface is also represented by a reference numeral 10.

In accordance with the embodiment, the guide rails 38 having a T-shaped cross-section is formed in the bracket 7, and the groove-like slidable engaging portion 40 is formed in the washer case 9. Alternatively, the guide rail 38 having a T-shaped cross-section can be formed in the inner surface of the side wall 42 of the washer case 9, and the groove-like slidable engaging portion 40 can be formed in the bracket 7. In this situation, a punching hole for molding a guide rail, however, should be formed in the front end wall 12 of the washer case 9. In addition, the locking projection 17 can be formed in the guide rail 38, and a locking hole 16 which is not a through-hole can be formed in the slidable engaging portion 40. Accordingly, the thin walls (flexible portion) 47 and 49 as shown in FIG. 6 cannot be formed.

In accordance with the embodiment, a pair of the guide rails 38, including left and right guide rails 38, are present. However, only either one of left or right guide rails is also possible. In this case, only either one of left and right slidable engaging portion 40 is formed. In addition, in accordance with the embodiment, the guide rail 38 having a T-shaped cross-section is formed. However, the guide rail 38 having a L-shaped cross-section can be also fainted. In this situation, the left guide rail 38 as shown in FIG. 7 has a L-shaped cross-section, and the right guide rail 38 has a cross-section which is symmetrical to the L-shaped cross-section of the left guide rail 38. The locking projection 17 is formed in the outer surface of each of the guide rails 38, and the inner space (i.e., a groove) of the slidable engaging portion 40 accordingly also has a L-shaped cross-section or a cross-section symmetrical to L-shaped cross-section in conformity with the guide rail 38.

In accordance with the embodiment, the depression 30 is formed in the bracket 7 so as to receive and position the washer. Alternatively, it is also possible to form the depression in not the bracket 7 but the washer case 9 so as to receive the washer therein. Further, disconnection or deviation of the washer 10 from the washer case 9 may be protected or prevented by only the rib 32 without the depression 30.

In accordance with the embodiment, the bracket 7 is disposed in the middle frame (i.e., frame 2) of the electric junction box 1. However, in the case of the electric junction box 1 without such a middle frame, it is possible to form the bracket 7 integrally with or independently of the body of the electric junction box such as a lower cover, main cover, and so on. In a case where the bracket is separately formed, a punching of the resin molding (for example, the formation of the depression 30 and guide rail 38) can be facilitated. In addition to the electric junction box 1, the bracket configuration in accordance with the invention can be also applied to a wiring harness proctor (not shown) having a rectangular tube and for protecting the wiring harness from any interferences from the outside, and a connector block (not shown) in which a plurality of connectors is bundled together.

The washer-retaining bracket configuration in accordance with the present invention is configured to retain or hold the washer within the washer case mounted to the bracket, to prevent or protect the washer from deviation or disconnection from the washer case via the clearance gap between the washer case and the bracket, and to cause the washer case to smoothly engage with the bracket with less force while preventing the harmful deformation which may create the clearance gap between the washer case and the bracket, when the bracket of the electric junction box is fixed to the vehicle body or panel via a screw fastening.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A bracket configuration for retaining a washer within a washer case which has an opening for inserting a bracket therethrough so that the washer case is mounted to the bracket from above the washer, comprising:
   a hole configured to insert a bolt therethrough, wherein the washer is disposed on the hole, the hole being formed through an inclined wall of the bracket and the washer having contact with a surface of the inclined wall, and
   a rib formed on the bracket along an edge of the opening so as to prevent or protect the washer from deviation or disconnection via a clearance gap created between the opening and the bracket,
   wherein the washer case is mounted to the bracket in a direction perpendicular to a direction in which the hole opens,
   wherein the bracket has a vertical wall and an inclined wall which is continuous with the vertical wall, wherein the washer is disposed on the inclined wall, wherein the rib extends from a site or area where the vertical wall intersects with the inclined wall such that the rib has an outer surface which lies the same plane with an extended surface of the vertical wall, and wherein the rib has both sides which are made higher than a center portion of the rib.

2. The bracket configuration according to claim 1, wherein the bracket has a circular depression configured to receive the washer therein and formed around the hole, and wherein the rib has an arc-like inner surface formed along an inner periphery of the depression.

3. The bracket configuration according to claim 1, wherein the bracket has a guide rail disposed in its lateral portion and engageable with an slidable engaging portion of the washer case, wherein the guide rail has a locking projection, which is formed on an outer surface of the guide rail and is engageable with an engaging hole of the slidable engaging portion, and wherein the slidable engaging portion has a flexible thin wall formed from the opening to a near side of the engaging hole.

4. The bracket configuration according to claim 2, wherein the bracket has an vertical wall and an inclined wall which is continuous with the vertical wall, wherein the washer is disposed on the vertical wall, wherein the rib extends from a site or area where the vertical wall intersects with the inclined wall such that the rib has an outer surface which lies the same plane with an extended surface of the vertical wall, and wherein the rib has both sides which are made higher than a center portion of the rib.

5. The bracket configuration according to claim 2, wherein the bracket has a guide rail disposed in its lateral portion and engageable with an slidable engaging portion of the washer case, wherein the guide rail has a locking projection, which is formed on an outer surface of the guide rail and is engageable with an engaging hole of the slidable engaging portion, and wherein the slidable engaging portion has a flexible thin wall formed from the opening to a near side of the engaging hole.

6. The bracket configuration according to claim 4, wherein the bracket has a guide rail disposed in its lateral portion and engageable with an slidable engaging portion of the washer case, wherein the guide rail has a locking projection, which is formed on an outer surface of the guide rail and is engageable with an engaging hole of the slidable engaging portion, and wherein the slidable engaging portion has a flexible thin wall formed from the opening to a near side of the engaging hole.

7. The bracket configuration according to claim 1, wherein the washer is disposed on the hole and is movable in radial directions.

\* \* \* \* \*